(12) United States Patent
Garavuso et al.

(10) Patent No.: US 7,858,878 B2
(45) Date of Patent: Dec. 28, 2010

(54) FLUSH MOUNT-CORNER MOUNT GANG BOX

(75) Inventors: Michael Garavuso, Lindenhurst, NY (US); James Michael Dodd, Saint James, NY (US); Tom Babich, Glen Cove, NY (US)

(73) Assignee: Honeywell International Inc., Morristown, NJ (US)

( * ) Notice: Subject to any disclaimer, the term of this patent is extended or adjusted under 35 U.S.C. 154(b) by 281 days.

(21) Appl. No.: 12/210,523

(22) Filed: Sep. 15, 2008

(65) Prior Publication Data
US 2010/0067176 A1    Mar. 18, 2010

(51) Int. Cl.
*H01H 9/02* (2006.01)
(52) U.S. Cl. .............................. 174/58; 174/50; 174/62; 174/64; 174/57; 248/343; 439/535
(58) Field of Classification Search ............... 174/50, 174/58, 57, 61, 62, 63, 64; 220/4.02; 248/343, 248/906; 439/535; 29/428; 52/220.7, 220.8; 361/679
See application file for complete search history.

(56) References Cited

U.S. PATENT DOCUMENTS

| 7,439,442 | B2* | 10/2008 | Schutte | 174/50 |
| 7,510,159 | B2* | 3/2009 | Rippel | 248/343 |
| 7,518,059 | B2* | 4/2009 | Herth | 174/58 |
| 7,544,889 | B1* | 6/2009 | Sanchez | 174/58 |
| 7,592,542 | B1* | 9/2009 | Gerardo | 174/58 |
| 7,595,447 | B2* | 9/2009 | Vrame | 174/58 |

* cited by examiner

*Primary Examiner*—Dhiru R Patel
(74) *Attorney, Agent, or Firm*—Husch Blackwell LLP—Welsh Katz

(57) ABSTRACT

The present invention includes a housing for hanging or mounting a wire and a device in a corner between two walls of a building. The housing includes an angular back plate. The angular back plate is bifurcated at an acute angle and the backplate further includes an angular raised portion which is similarly bifurcated at an acute angle and positioned in mating relation with the angular back plate. The raised portion is recessed from top, bottom and side edges of the angular back plate. The raised portion has planar front portions in angular relation to each other and enclosing the raised portion. The back plate is mounted to a corner defined by the wall frames using back plate holes. The angular raised portion mates with a building material affixed to the building wall frame. One of the planar front portions of the angular raised portion defines a hole for passing the wire therethrough.

18 Claims, 5 Drawing Sheets

FLUSH MOUNT-CORNER MOUNT GANG BOX

FIELD OF THE INVENTION

The present invention relates to housings, electrical junction boxes and gang boxes for used in construction, and more particularly, a housing and method for hanging electrical wires in a wall corner during building construction.

BACKGROUND OF THE INVENTION

Currently during building construction, a housing such as an electrical junction box or gang box is positioned in a wall, usually attached to a stud, before further construction of the wall, e.g., attaching drywall to the frame. Such boxes house and mount, for example, electric outlets and switches, and are positioned in the wall frame on a beam or stud during pre-construction, i.e., before dry walling. A typical problem with installation of electronic devices including, for example, alarm systems or security systems including detectors, during construction of a building, whether commercial or residential, relates to running and placing a wire in a corner between wall frames during pre-wirings. The wire may be positioned in the corner on a nail, or the like, in the studs or beams of the framed walls. Other workers or craftsman on the building construction site, for example, applying drywall, for example, Sheetrock™, frequently move the wire. The workers move the wire because the drywall construction cannot be completed to specification, i.e., a corner with abutting drywall having joint compound and tape ready for primer and painting, with the wire and nail protruding from the frame. For example, the wire may be moved by the worker applying drywall, or lost behind the drywall, or erroneously cut. If the wire is moved to another location, for example, hung on another stud for the flat surface of the wall instead of the corner, the wire may be included in a junction box in the wall and the device, when installed, will not be in the correct location. This is especially critical when installing detectors for an alarm system. Further, when an installation wire is moved or cut, the installer must spend time to relocate or rewire, which increases labor costs.

Attempts to fasten a wire and detector to the beams or studs once drywall is in place may require trial and error and may cause damage to the drywall which would need to be repaired. A further disadvantage of attaching a device in a corner once drywall is in place includes the need for multiple screws or the like to mount a device such as a detector through the drywall opening the opportunity for damage to the drywall and the need to cover screw heads. Further, mounting the detector to the drywall itself is not as stable as mounting to a beam and also may damage the drywall and require repair.

For example, it is advantageous to mount motion detectors in a corner to optimize coverage and performance. Many other devices are also corner mount and need to have a wire run to the device such as, video cameras, sirens and audio speakers.

It would therefore be desirable to provide a device and method for hanging or installing a wire in a corner during pre-wire installation of building construction. It would further be desirable to hang the wire using an easily recognizable device for other craftsman and construction workers to recognize and work around as construction continues on the building.

SUMMARY OF THE INVENTION

In an aspect of the invention, a housing for mounting a wire and device in a corner between two walls includes an angular back plate defining top, bottom, and side edges. The back plate is mountable to a building wall frame in a corner defined by two walls, and the angular back plate is bifurcated at an acute angle. An angular raised portion protrudes from the back plate, and the angular raised portion is bifurcated at an acute angle and positioned in mating relation with the angular back plate. The raised portion has top, bottom, and side wall edges recessed from the top, bottom and side edges of the angular back plate, respectively. The raised portion has planar front portions in angular relation to each other, and the angular raised portion has a specified height such that the top, bottom and side walls are mateable with a building material affixed to the building wall frame. At least one of the planar front portions of the angular raised portion defines a section for passing a wire therethrough.

In a related aspect, the acute angle is a ninety degree angle. In another related aspect, the back plate and raised portion are bifurcated along a substantially central axis at the acute angle such that each side of the back plate and raised portion is in opposing mirror image relation to the other. Additionally, the back plate may receive fastening devices for affixing the housing to the building wall frame. Further, the back plate and the raised portion may define a region therebetween for receiving an interior building material. The specified height of the raised portion may substantially equal a thickness of the mating building material. The back plate may define notches for sliding the housing into place with mating fasteners on the building wall frame. Also, the angular raised portion is may be mateable with drywall material providing a contiguous planar surface between front portions of the raised portion of the housing and the drywall material. The back plate may include holes for mounting the back plate to the building wall frame. The section of the front portion may define a hole for receiving the wire therethrough. The front portion may include a section for affixing a device thereto for mounting the device in the corner.

In another aspect of the invention, a method for mounting a wire and device in a corner between two walls comprises: providing a housing including an angular back plate being bifurcated at an acute angle, the housing including an angular raised portion protruding from the back plate, the angular raised portion having a specified height, the angular raised portion being bifurcated at an acute angle and positioned in mating relation with the angular back plate, the raised portion having top, bottom, and side wall edges recessed from top, bottom and side edges of the angular back plate, respectively, the raised portion having planar front portions in angular relation to each other; providing a building wall frame having a corner defined by two walls; mounting the housing to the corner of the building wall frame using holes defined in the back plate; mating the top, bottom and side walls of the angular raised portion with a building material affixed to the building wall frame providing a contiguous planar surface between the planar front portions of the raised portion of the housing and the building material; and passing a wire through a hole in at least one of the planar front portions of the angular raised portion.

In a related aspect, the method further includes: affixing a device to the housing for mounting the device in the corner.

The device may be affixed to at least one of the front portions of the raised portion. The method may further include connecting the device to the wire, before affixing the device to the housing. The device may be a detector for a security system.

In another aspect of the invention, a wire and device mounting system comprises a housing for hanging a wire in a corner between two walls. The housing includes an angular back plate defining top, bottom, and side edges, the back plate defines holes for mounting the back plate. The angular back plate is bifurcated at an acute angle, and an angular raised portion protrudes from the back plate. The angular raised portion is bifurcated at an acute angle and positioned in mating relation with the angular back plate. The raised portion has top, bottom, and side walls recessed from the top, bottom and side edges of the angular back plate, respectively. The raised portion has planar front portions in angular relation to each other, and the back plate is mountable to a wall frame in a corner defined by the wall frame and another wall frame using the back plate holes. The angular raised portion has a specified height such that the top, bottom and side walls are mateable with a building material affixed to the building wall frames providing a contiguous planar surface between the planar front portions of the raised portion of the housing and the building material. At least one of the planar front portions of the angular raised portion defines a hole for passing the wire therethrough. An electronic device is connectable to the wire and mountable to the housing for mounting the device in the corner. The device may be a detector in a security system.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
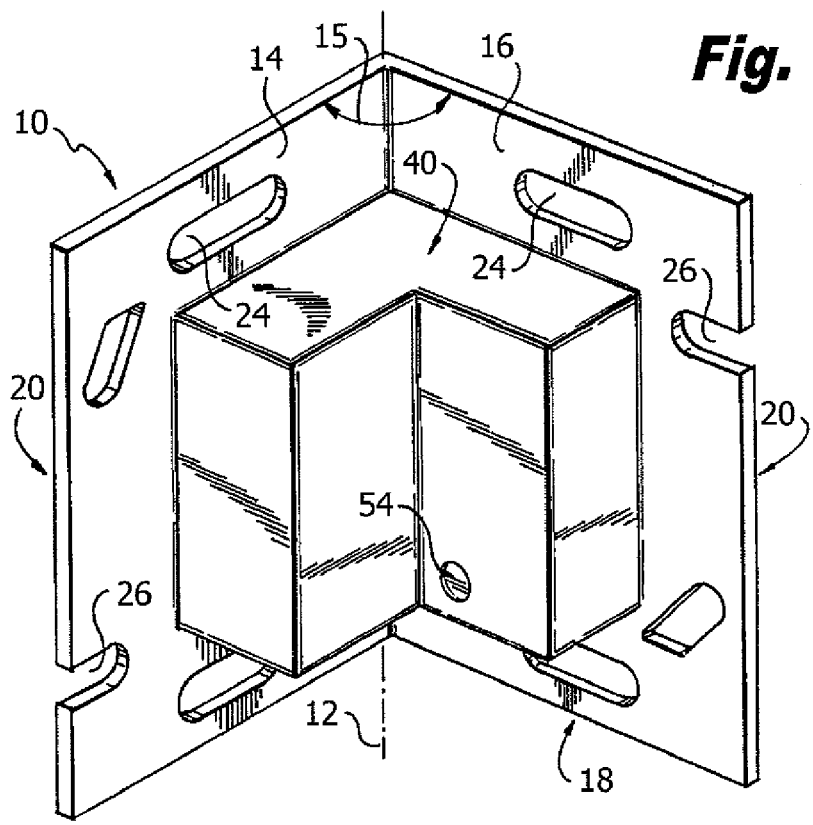
FIG. 1 is a perspective view of a housing according to an embodiment of the present invention.
Figure 2:
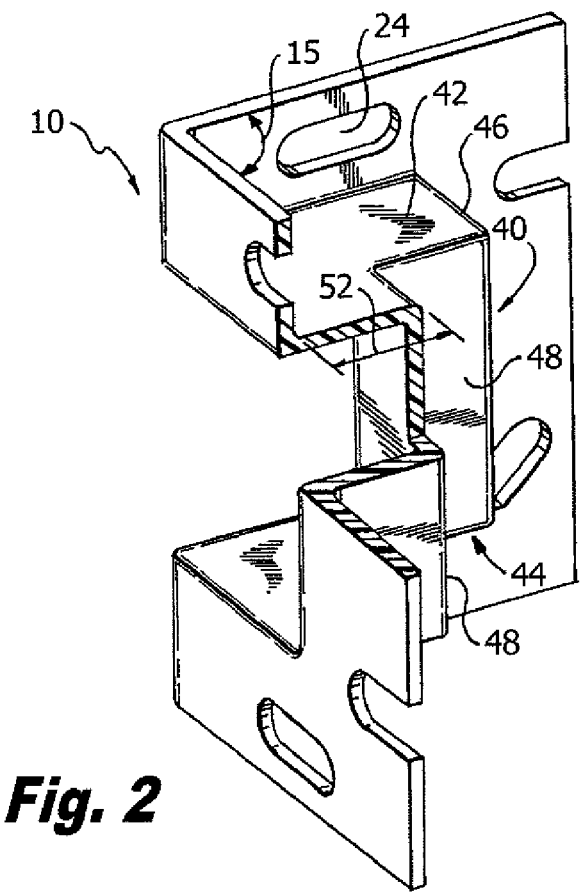
FIG. 2 is a another perspective view of the housing shown in FIG. 1.

Referring to FIGS. 1 and 2, an illustrative embodiment according to the present invention of a housing 10 for hanging a wire 70 (shown in FIG. 4) in a corner defined by wall frames. The housing 10 may also be referred to as a box or a corner mounted gang box. The housing 10 includes an angular back plate 14 having top 16, bottom 18, and opposite side edges 20. The back plate 14 includes holes 24 and slots 26 for mounting the back plate to a building wall frame 30, shown in FIG. 3. The building wall frame 30 includes a corner 32 defined by studs, for example, wood studs 34 shown in FIGS. 3 and 4.

The angular back plate 14 is bifurcated at an acute angle 15 about an axis 12, which in the embodiment of the invention shown in FIGS. 1 and 2, is ninety degrees. However, the back plate can also be divided at other angles. The housing 10 further includes an angular raised portion 40 integral with the back plate 14. The angular raised portion 40 may be molded together with the back plate 14, or alternatively may be affixed to the back plate 14. The angular raised portion is bifurcated at the same acute angle as the back plate 14 and is positioned in mating relation with the angular back plate 14 about the axis 12. The angular raised portion 40 and the angular back plate 14 are thus in opposing mirror image relation to the other about the axis 12. The raised portion 40 has top 42, bottom 44, and side walls 48 each having respective edges recessed from the top 16, bottom 18 and side edges 20 of the back plate 14, respectively. The raised portion 40 has planar front portions 48 in angular relation to each other and enclosing the raised portion 40. The front portions 48 may be designed to have portions that punch out to allow the wire or wires to extend therethrough. Such portions may be the diameter of a wire or a section of the front portion 48. The angular raised portion 40 has a specified height 52 such that the top 42, bottom 44 and side walls 46 mate with a building material embodied as drywall 60 (FIG. 5) affixed to the building wall frame studs 34. A hole 54 passes through one of the planar front portions 48 of the raised portion 14 for passing the wire 70 therethrough, as shown in FIGS. 4-6.

Figure 3:
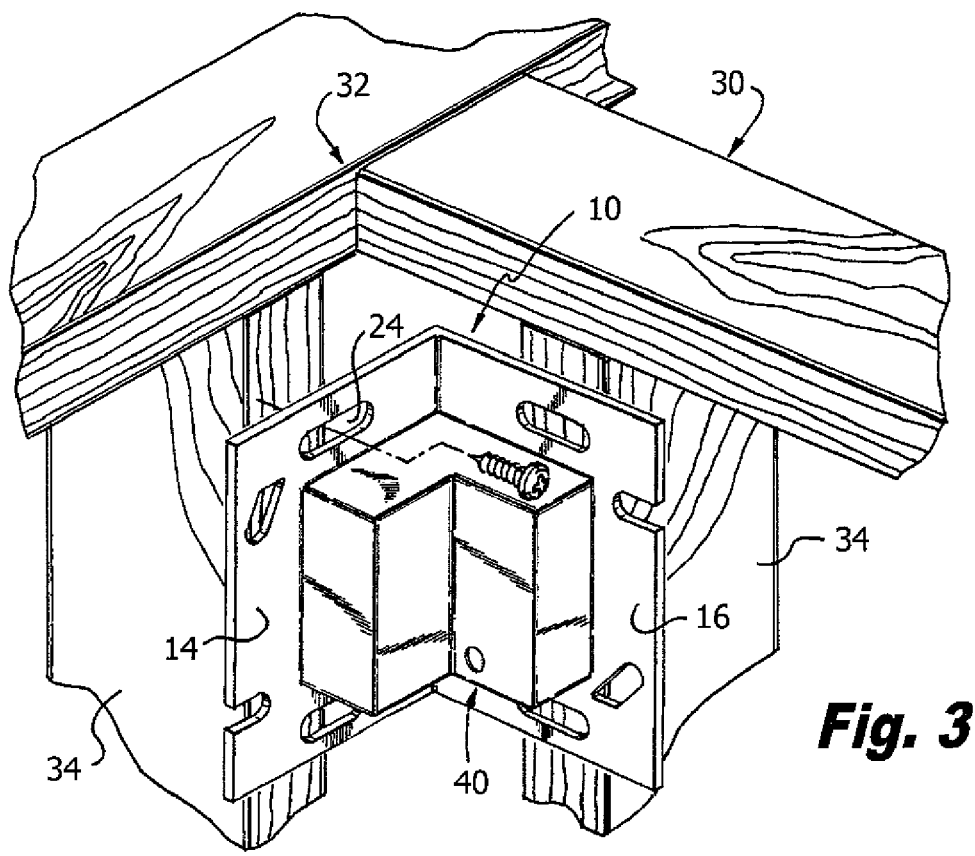
FIG. 3 is a perspective view of the housing shown in FIGS. 1 and 2 mounted in a corner of two wall frames.
Figure 4:
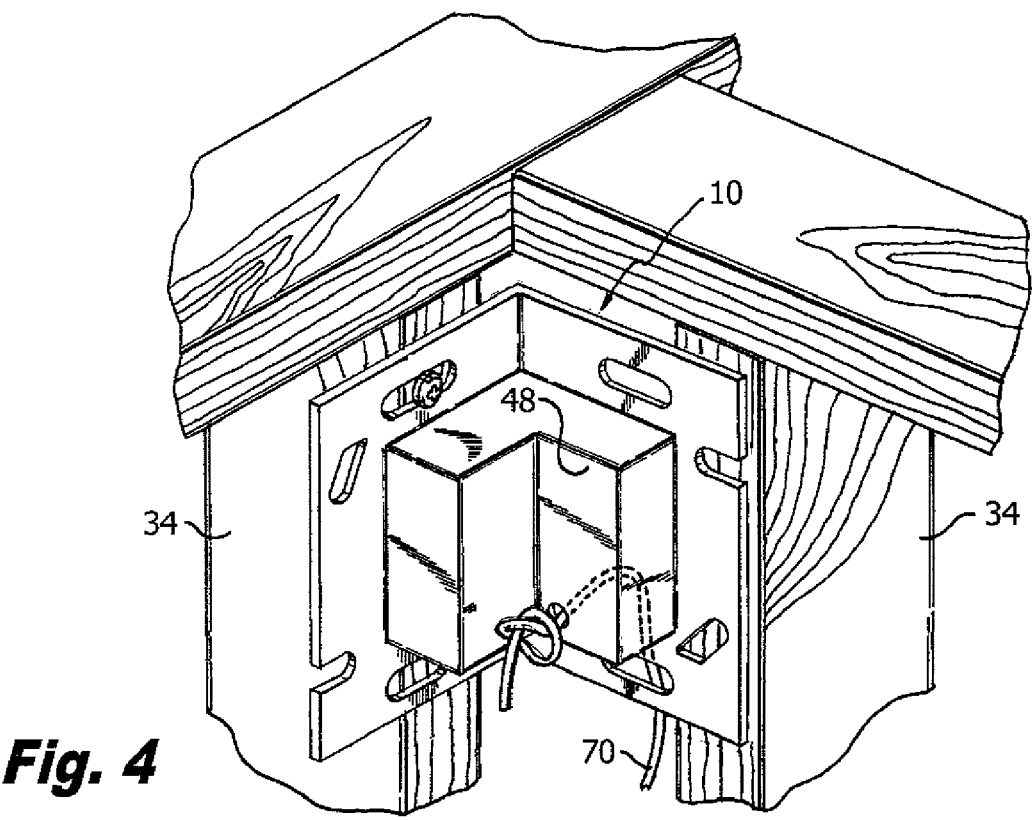
FIG. 4 is another perspective view of the housing mounted in the corner of two walls as shown in FIG. 3 additionally showing a wire through the housing.

Referring to FIGS. 3 and 4, the holes 24 in the back plate 14 of the housing 10 are used to fasten the housing 10 to the wall frame 30, for example, by driving screws (not shown) through the holes 24 into the wood studs 34. Alternatively, the slots 26 may be used by sliding the back plate 14 into place on screws (not shown) in the wood studs 34.

As can be seen in FIG. 4, the wire 70 is passed through the hole 54 and tied off, by making a knot, to maintain its place. Drywall, for example Sheetrock™, may then be placed around the housing 10 by cutting a hole in the drywall matching the perimeter of the raised portion 40. The region between the edges of the back plate 14 and the raised portion 40 define a region therebetween for receiving the drywall. The specified height 52 of the raised portion 40 equals the thickness of the drywall 60, as shown in FIG. 5.

Figure 5:
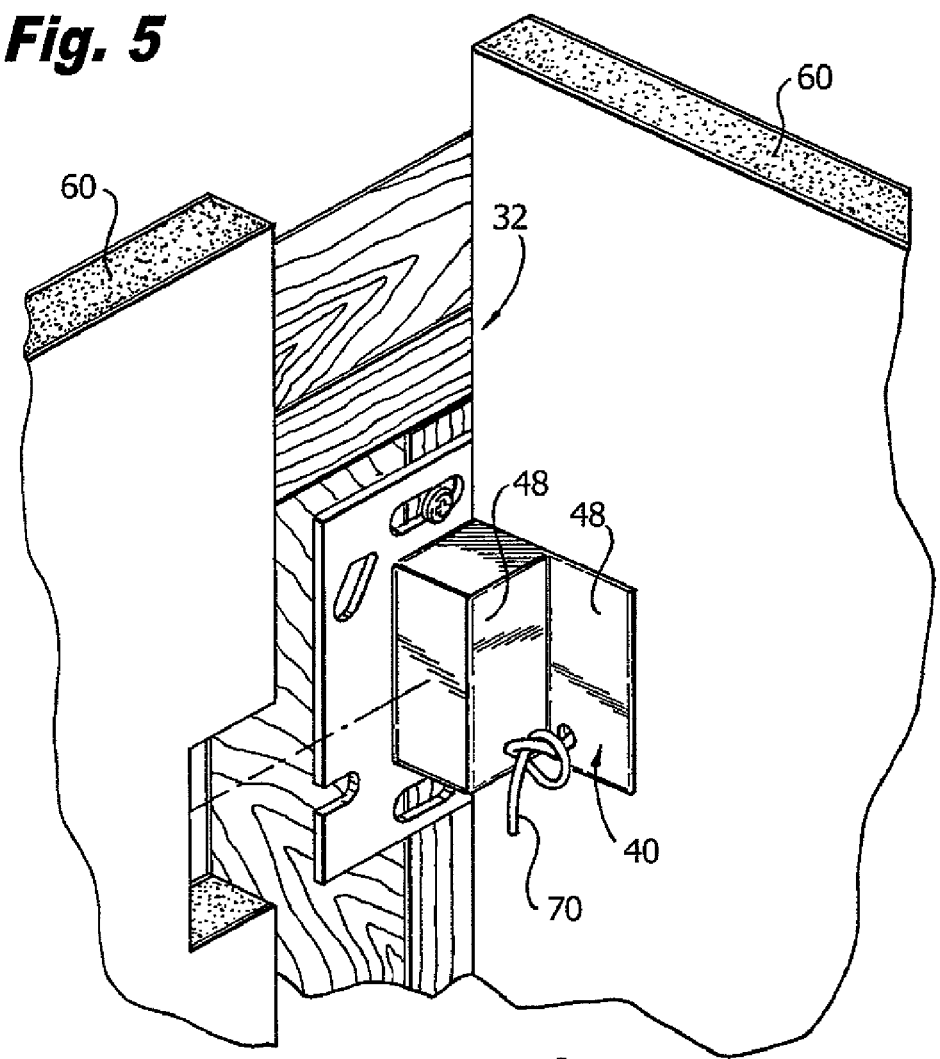
FIG. 5 is a perspective view of the mounted housing shown in FIGS. 3 and 4 mating with drywall affixed to the wall frames.
Figure 6:
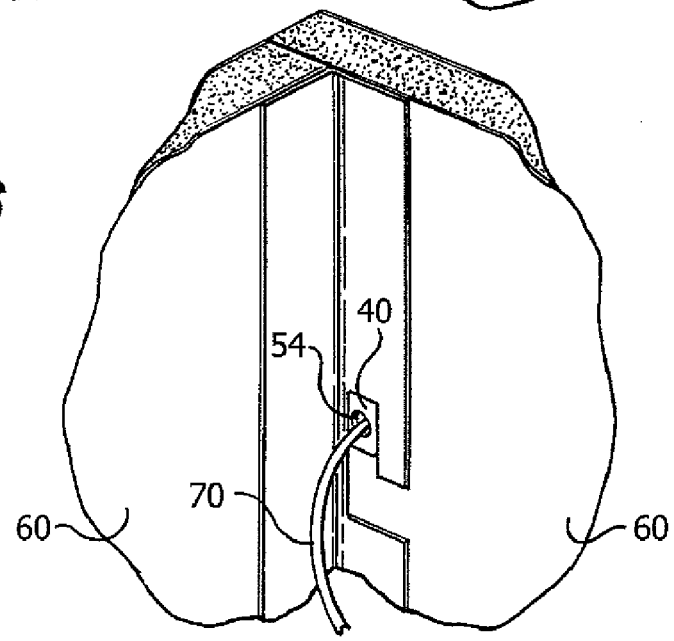
FIG. 6 is a perspective view of the mounted housing covered with joint compound and tape.

As can be seen in FIG. 5, the planar front portions 48 are contiguous and flush with the drywall 60. A craftsman may then use joint compound and tape to cover the exposed front portions 48 of the housing 10 leaving only the wire protruding, as shown in FIG. 6. The housing 10 may be made in the industry standard color of light blue which is easily identifiable by craftsman installing drywall, and thus, other workers will be aware to tape around the mounted housing 10 and extending wire 70 appropriately.

Figure 7:
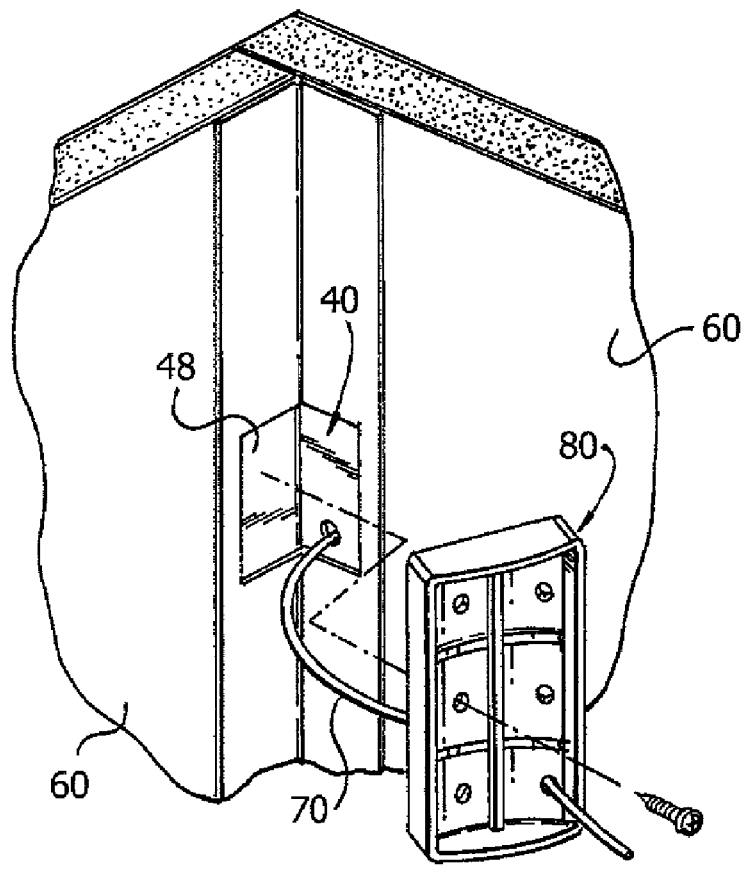
FIG. 7 is a perspective view of the mounted housing and a back plate for a device.
Figure 8:
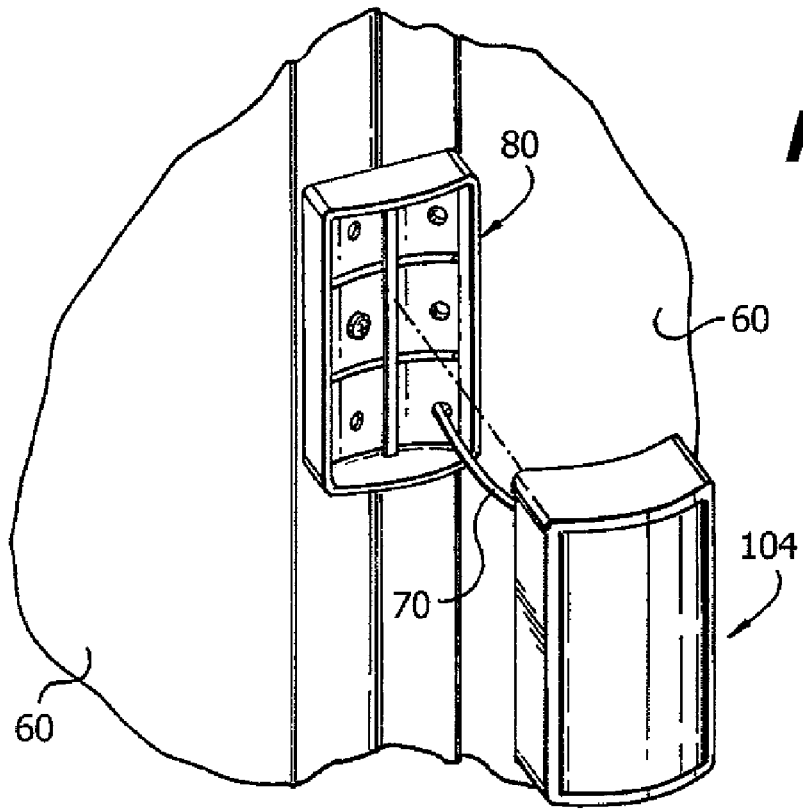
FIG. 8 is a perspective view of the back plate being affixed to the mounted housing.

A detector device, for example, a motion detector in an alarm system (FIG. 9), may be mounted to the housing 10 by mounting a back panel 80 (shown in FIGS. 7 and 8) of the detector (not shown) to the housing 10. This may be achieved by screwing the back panel 80 to the exposed planar front portions 48 using a pilot hole through the front portions 48. One advantage of the present invention is that mounting a detector only requires one fastening device such as a screw to the housing 10 front portions 48, as opposed to using two or more screws to beams or studs located behind the drywall.

Figure 9:
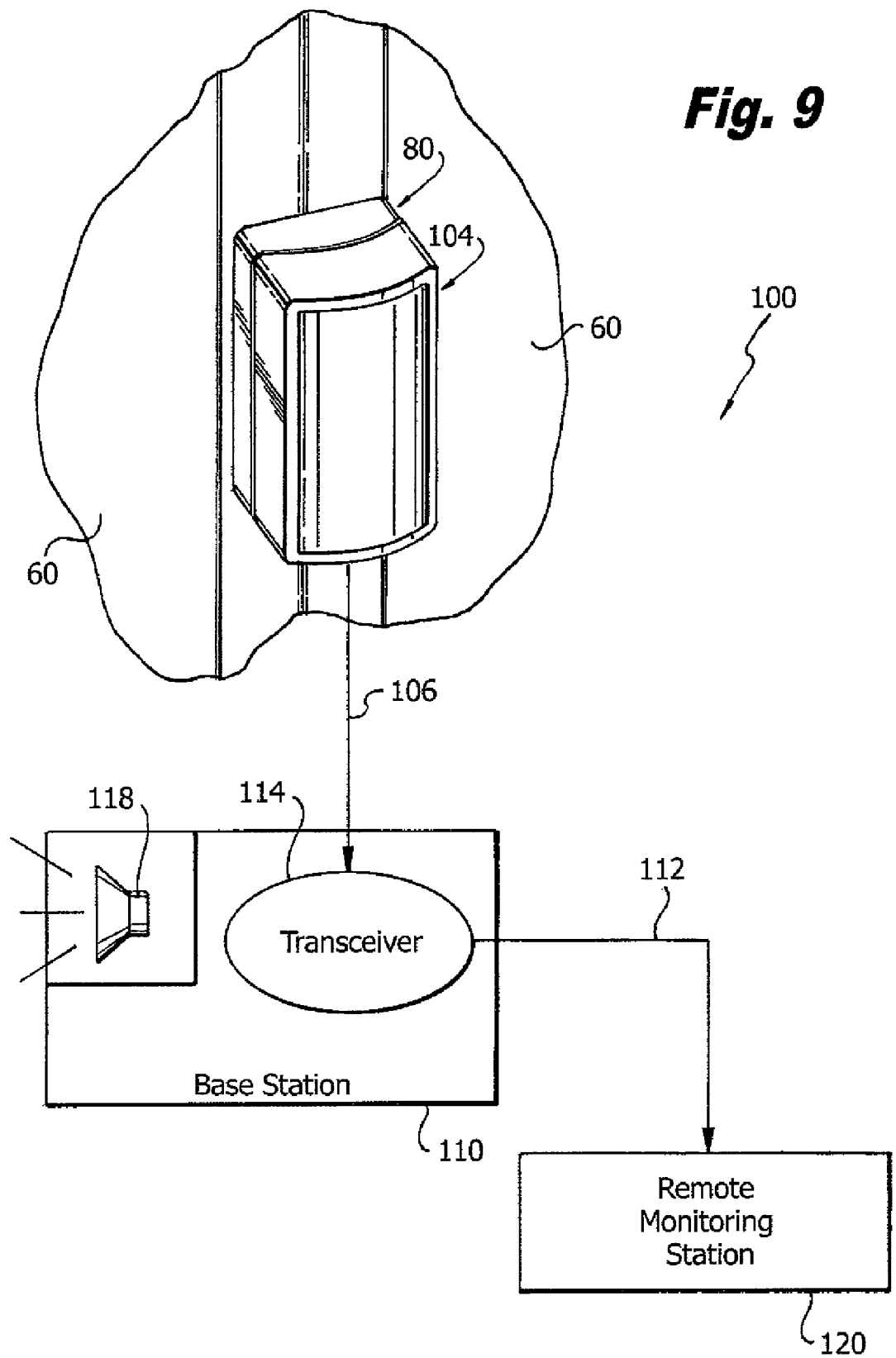
FIG. 9 is a block diagram of a security system using the housing shown in FIGS. 1-7.

As shown in FIG. 9, an alarm system 100 includes the back panel 80 of a detector 104 affixed to the front portion 48 of the housing 10 (not fully visible). The detector 104 may be, for example, a motion detector. The detector 104 is electrically connected to the wire 70 and can communicate 106 with a transceiver 114 of a base station 110 of the alarm system 100. The base station can sound a local alarm 118 and/or transmit a signal 112 to a remote monitoring station 120 using the transceiver 114.

Thereby, a system and method for hanging the wire 70 in the corner 32 between two walls 60 includes positioning the housing 10 on studs or beams 34 in the corner 32 defined by two walls 60 of the building wall frame 30. The housing is mounted to the corner 32 of the building wall frame using holes 24 or 26 in the back plate 14 to screw the back plate 14 to the studs or beams 34. The wire 70 is passed through the hole 54 in the planar front portion 48 of the angular raised portion 40 before applying drywall, while the wall frames 30 are open. The drywall 60 is mated to the top 42, bottom 44 and side walls 46 of the angular raised portion 40 to provide a contiguous planar surface between the planar front portions 48 of the raised portion 40 of the housing 10 and the drywall 60. The wire 70 thereby is mounted in the corner for attachment to any of a multitude of devices requiring corner mounting. A device such as a detector for an alarm system may then be mounted to the front portions 48 of the housing 10. Thereby, a low cost and efficient way of mounting a device in a corner is provided by mounting a housing 10 for hanging a wire in a corner. Further construction may then take place, e.g., drywalls, etc., and then a detector for an alarm system, for example can be installed. The housing 10 may also be used as an electrical junction box or for mounting other kinds of detectors.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A housing for mounting a wire and device in a corner between two walls of a building, comprising:
   an angular back plate defining top, bottom, and side edges, the back plate being mountable to a building wall frame in a corner defined by two walls, the angular back plate being bifurcated at an acute angle; and
   an angular raised portion protruding from the back plate, the angular raised portion being bifurcated at an acute angle and positioned in mating relation with the angular back plate, the raised portion having top, bottom, and side wall edges recessed from the top, bottom and side edges of the angular back plate, respectively, the raised portion having planar front portions in angular relation to each other, the angular raised portion having a specified height such that the top, bottom and side wall edges of the angular raised portion are mateable with a mating building material affixed to the building wall frame, and at least one of the planar front portions of the angular raised portion defining a section for passing a wire therethrough.

2. The housing of claim 1, wherein at least one of the acute angle of the angular back plate and the acute angle of the angular raised portion is a ninety degree angle.

3. The housing of claim 1, wherein the back plate and raised portion are bifurcated along a substantially central axis at the acute angle of the back plate and the raised portion, respectively, such that each side of the back plate and raised portion is in opposing mirror image relation to the other.

4. The housing of claim 1, wherein the back plate receives fastening devices for affixing the housing to the building wall frame.

5. The housing of claim 1, wherein the back plate and the raised portion define a region therebetween for receiving an interior building material.

6. The housing of claim 1, wherein the specified height of the raised portion substantially equals a thickness of the mating building material.

7. The housing of claim 1, wherein the back plate defines notches for sliding the housing into place with mating fasteners on the building wall frame.

8. The housing of claim 1, wherein the angular raised portion is mateable with drywall material providing a contiguous planar surface between front portions of the raised portion of the housing and the drywall material.

9. The housing of claim 1, wherein the back plate includes holes for mounting the back plate to the building wall frame.

10. The housing of claim 1, wherein the section of the front portion defines a hole for receiving the wire therethrough.

11. The housing of claim 1, wherein the front portion includes a section for affixing a device thereto for mounting the device in the corner.

12. A method for mounting a wire and device in a corner between two walls of a building, comprising:
   providing a housing including an angular back plate being bifurcated at an acute angle, the housing including an angular raised portion protruding from the back plate, the angular raised portion having a specified height, the angular raised portion being bifurcated at an acute angle and positioned in mating relation with the angular back plate, the raised portion having top, bottom, and side wall edges recessed from top, bottom and side edges of the angular back plate, respectively, the raised portion having planar front portions in angular relation to each other;
   providing a building wall frame having a corner defined by two walls;
   mounting the housing to the corner of the building wall frame using holes defined in the back plate;
   mating the top, bottom and side walls of the angular raised portion with a building material affixed to the building wall frame providing a contiguous planar surface between the planar front portions of the raised portion of the housing and the building material; and
   passing a wire through a hole in at least one of the planar front portions of the angular raised portion.

13. The method of claim 12, further including:
   affixing a device to the housing for mounting the device in the corner.

14. The method of claim 13, wherein the device is affixed to at least one of the front portions of the raised portion.

15. The method of claim 13, further including:
   connecting the device to the wire, before affixing the device to the housing.

16. The method of claim 13, wherein the device is a detector for a security system.

17. A wire and device mounting system, comprising:
   a housing for hanging a wire in a corner between two walls of a building, the housing including an angular back plate defining top, bottom, and side edges, the back plate defining holes for mounting the back plate, the angular back plate being bifurcated at an acute angle, an angular raised portion protruding from the back plate, the angular raised portion being bifurcated at an acute angle and positioned in mating relation with the angular back plate, the raised portion having top, bottom, and side walls recessed from the top, bottom and side edges of the angular back plate, respectively, the raised portion having planar front portions in angular relation to each other, the back plate being mountable to a wall frame in a corner defined by the wall frame and another wall frame using the back plate holes, the angular raised portion having a specified height such that the top, bottom and side wall edges of the angular raised portion are mateable with a building material affixed to the building wall frames providing a contiguous planar surface between the planar front portions of the raised portion of the housing and the building material, and at least one of the planar front portions of the angular raised portion defines a hole for passing the wire therethrough; and an electronic device being connectable to the wire and mountable to the housing for mounting the device in the corner.

18. The system of claim 17, wherein the device is a detector in a security system.

* * * * *